United States Patent
Zhang et al.

(10) Patent No.: US 12,511,271 B2
(45) Date of Patent: Dec. 30, 2025

(54) COMPUTER-IMPLEMENTED METHODS AND COMPUTING SYSTEMS FOR REORGANIZING DATA

(71) Applicants: Zanqing Zhang, Markham (CA); Michael Chih Hung Li, Markham (CA); Fatemeh Mansour Kiaie, Richmond Hill (CA); Sundar Annamalai, Ajax (CA); Ahmed Helal, Toronto (CA)

(72) Inventors: Zanqing Zhang, Markham (CA); Michael Chih Hung Li, Markham (CA); Fatemeh Mansour Kiaie, Richmond Hill (CA); Sundar Annamalai, Ajax (CA); Ahmed Helal, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/416,606

(22) Filed: Jan. 18, 2024

(65) Prior Publication Data
US 2025/0238406 A1 Jul. 24, 2025

(51) Int. Cl.
*G06F 16/21* (2019.01)
*G06F 11/34* (2006.01)
*G06F 16/22* (2019.01)

(52) U.S. Cl.
CPC ........ *G06F 16/213* (2019.01); *G06F 11/3409* (2013.01); *G06F 16/2282* (2019.01); *G06F 16/2291* (2019.01)

(58) Field of Classification Search
CPC ............... G06F 16/213; G06F 11/3409; G06F 16/2282; G06F 16/2291
USPC ................................ 707/737, 802, 803, 792
See application file for complete search history.

(56) References Cited

U.S. PATENT DOCUMENTS

| | | | |
|---|---|---|---|
| 2015/0199393 A1* | 7/2015 | Friske ................. | G06F 16/2282 707/803 |
| 2015/0234895 A1* | 8/2015 | Erdogan ............. | G06F 16/2471 707/718 |
| 2019/0266154 A1* | 8/2019 | Wu ...................... | G06F 16/2465 |
| 2024/0129506 A1* | 4/2024 | Chen .................... | H04N 19/176 |
| 2024/0275965 A1* | 8/2024 | Gao ..................... | H04N 19/105 |

(Continued)

OTHER PUBLICATIONS

Aly, Ahmed M., et al., "AQWA: Adaptive Query-Workload-Aware Partitioning of Big Spatial Data", Proceedings of the VLDB Endowment, vol. 8, No. 13, pp. 2062-2073, 2015.

(Continued)

*Primary Examiner* — Phong H Nguyen

(57) ABSTRACT

Computer-implemented methods and computing systems for reorganizing data are disclosed. One or more user defined functions (UDFs) are applied to one or more columns of a data set to generate a hidden column. The data set partitioned according to a first partition scheme and the hidden column are stored in memory of a computing system. A set of queries run against the data set and the hidden column are stored in the memory. Each query in the set of queries and the one or more UDFs are processed with a machine learning model to select a second partition scheme for the data set. The data set in the memory is reorganized according to the second partition scheme.

15 Claims, 7 Drawing Sheets

(56) References Cited

U.S. PATENT DOCUMENTS

2024/0291708 A1* 8/2024 Panwar ................ G06F 16/26

OTHER PUBLICATIONS

Shanbhag, Anil, et al., "A Robust Partitioning Scheme for Ad-Hoc Query Workloads", https://doi.org/10.1145/3127479.3131613, pp. 229-241, 2017.

Aly, Ahmed M., et al., "Kangaroo: Workload-Aware Processing of Range Data and Range Queries in Hadoop", http://dx.doi.org/10.1145/2835776.2835841, pp. 397-406, 2016.

Du, Jiang, et al., "DeepSea: Progressive Workload-Aware Partitioning of Materialized Views in Scalable Data Analytics", 20th International Conference on Extending Database Technology, Mar. 21-24, 2017.

Li, Zhe, et al., "PAW: Data Partitioning Meets Workload Variance", 2022 IEEE 38th International Conference on Data Engineering (ICDE), pp. 123-135, 2022.

* cited by examiner

COMPUTER-IMPLEMENTED METHODS AND COMPUTING SYSTEMS FOR REORGANIZING DATA

TECHNICAL FIELD

The present disclosure relates to data structures, and, in particular, to systems and methods and systems for reorganizing data.

BACKGROUND

The proliferation of computers and data communications networks has enabled the collection of large amounts of data in databases by various groups. For example, companies can store data for purchases of individual products across a country or the world. The granularity of such data sets enables detailed analysis of purchasing trends, sales demographics, etc. As will be appreciated, however, the shear amount of data that must be analyzed in order to extract details from the data set can be daunting, thereby straining computing resources.

Most big data analytic engines employ an optimization technique called partitioning in which a table is organized into "partitions", or groups of related subsets of data. The partitions are based on the values of specific columns, such as date, city, or department.

Data partitioning reduces the amount of data to be read when a query is run by allowing data processing engines to skip entire partitions that don't satisfy the query predicate. This decreases I/O time, and hence significantly improves query performance.

There are, however, some challenges with data partitioning.

The partitioning scheme needs to be determined and defined during table creation time. To change the partitioning scheme, the data needs to be re-ingested.

Prior intimate knowledge of all the workloads and data are required in order to define the most optimal partitioning scheme. It represents the demand placed on the database by various operations such as reading, writing, updating and querying the data. Typically a database is partitioned in a certain way to accelerate specific workload. If the workload changes, then the existing partitioning scheme might no longer provide performance benefits. In such situations, a new partitioning scheme must be defined which would be expensive.

Ideally, partitions are based on columns with low cardinality, such as year, but in practice the columns have typically high cardinality, such as timestamp.

Several research efforts have emphasized the importance of taking the query workload into consideration when designing a database and when reorganizing the data. These approaches attempt to leverage the query-workload awareness to optimize the overall query execution and to be adaptive and continuously update data organization as future queries arrive (in a streaming manner).

In "AQWA: Adaptive Query-Workload-Aware Partitioning of Big Spatial Data", by Ahmed et al., Proceedings of the VLDB Endowment, Vol. 8, No. 13, 2015 (hereinafter "AQWA"), unlike majority of the existing systems that require recreating the partitions, the proposed system incrementally updates the partitioning according to the data changes and the query workload. An important characteristic of this approach is that it does not presume any knowledge of the data distribution or the query workload. Instead, this solution applies a lazy mechanism that reorganizes the data as queries are processed and as data is consumed and queries are processed, the data partitions are incrementally updated. Similarly, "Amoeba: a shape changing storage system for big data", by Shanbhag et al., Very Large Data Bases, August (hereinafter "Amoeba") discloses a proposed distributed storage system for adaptive data partitioning to support ad-hoc as well as recurring queries. The key idea in this approach is to build and maintain a partitioning tree on top of the dataset. The partitioning tree allows the answering of queries with predicates by reading a subset of the data. The initial partitioning tree is created without requiring an upfront query workload and the system adapts it over time by incrementally modifying subtrees based on user queries using repartitioning. An upfront partitioning algorithm is used to spread the benefits of partitioning over all attributes in a dataset. Subsequently, the partitioning adapts incrementally based on the predicates from the user queries. However, these systems cannot support range data and range queries. For instance, in AQWA, the data partitioning proposed for spatial data (2 dimensions) and their techniques do not scale to higher dimensions. Moreover, these approaches are focusing on splitting some existing partitions.

"DeepSea: Progressive workload-aware partitioning of materialized views in scalable data analytics", Du et al., EDBT 2017 (hereinafter "DeepSea") is another adaptive workload-aware approach for automatic materialization and partitioning of views. The major advantage of creating a partitioned view from an intermediate query result is that future queries with selection conditions over the partition attribute can be answered efficiently by accessing a subset of the view's fragments. However, partitioning a view increases the cost of view creation. Moreover, partitions are defined on materialized view not on the table, which are limited to the defined materialized views. It also needs to maintain multiple partitions of the same view on different attributes.

Recently "PAW: Data Partitioning Meets Workload Variance," Z. Li et al., 2022 IEEE 38th International Conference on Data Engineering (ICDE), Kuala Lumpur, Malaysia, 2022, pp. 123-135, doi: 10.1109/ICDE53745.2022.00014 addressed the deviation of the future query workload from the historical workload that leads to deterioration in the performance of existing workload-aware data reorganization methods. They model the variance of future query workloads from the historical query workload, then exploit its characteristic to produce partitions that perform well for future query workloads. However, their model suffers from the long network latency and is only designed for the range queries.

Despite the efforts on workload aware partitioning methods, none of these proposed approaches take the content of the columns into consideration for workload aware data reorganization.

SUMMARY

The present disclosure describes systems and methods which provide one or more efficient techniques to perform In accordance with a first aspect of the present disclosure, there is provided a computer-implemented method for reorganizing data, comprising: applying one or more user defined functions (UDFs) to one or more columns of a data set to generate a hidden column; storing the data set partitioned according to a first partition scheme and the hidden column in memory of a computing system; storing a set of queries run against the data set and the hidden column in the memory; processing each query in the set of queries and the one or more UDFs with a machine learning model to select a second partition scheme for the data set; and reorganizing the data set in the memory according to the second partition scheme.

In some or all exemplary embodiments of the first aspect, the one or more UDFs reduce the cardinality of the one or more columns of the data set.

In some or all exemplary embodiments of the first aspect, the method further comprising storing query statistics for each of the set of queries, and wherein the processing each query in the set of queries includes processing the query statistics for each of the set of queries.

In some or all exemplary embodiments of the first aspect, the processing is performed at a regular interval.

In some or all exemplary embodiments of the first aspect, the regular interval is a time interval.

In some or all exemplary embodiments of the first aspect, the regular interval is a query frequency interval.

In some or all exemplary embodiments of the first aspect, the processing comprises: selecting two or more candidate partition schemes; evaluating a benefit factor for each of the two or more candidate partition schemes; and selecting the second partition scheme from the two or more candidate partition schemes based on the benefit factor for each of the two or more candidate partition schemes.

In a second aspect of the present disclosure, there is provided a computing system for reorganizing data, comprising: one or more processors; memory storing computer-executable instructions that, when executed by the one or more processors, cause the computing system to: apply one or more user defined functions (UDFs) to one or more columns of a data set to generate a hidden column; store the data set partitioned according to a first partition scheme and the hidden column in memory of a computing system; store a set of queries run against the data set and the hidden column in the memory; process each query in the set of queries and the one or more UDFs with a machine learning model to select a second partition scheme for the data set; and reorganize the data set in the memory according to the second partition scheme.

In some or all exemplary embodiments of the second aspect, the one or more UDFs reduce the cardinality of the one or more columns of the data set.

In some or all exemplary embodiments of the second aspect, the computer-executable instructions, when executed by the one or more processors, cause the computing system to store query statistics for each of the set of queries, and wherein the processing each query in the set of queries includes processing the query statistics for each of the set of queries.

In some or all exemplary embodiments of the second aspect, the computer-executable instructions, when executed by the one or more processors, cause the computing system to process the queries at a regular interval.

In some or all exemplary embodiments of the second aspect, the regular interval is a time interval.

In some or all exemplary embodiments of the second aspect, the regular interval is a query frequency interval.

In some or all exemplary embodiments of the second aspect, the computer-executable instructions, when executed by the one or more processors, cause the computing system to: select two or more candidate partition schemes; evaluate a benefit factor for each of the two or more candidate partition schemes; and select the second partition scheme from the two or more candidate partition schemes based on the benefit factor for each of the two or more candidate partition schemes.

In a third aspect of the present disclosure, there is provided a non-transitory machine-readable medium having tangibly stored thereon executable instructions for execution by one or more processors, wherein the executable instructions, in response to execution by the one or more processors, cause the one or more processors to: apply one or more user defined functions (UDFs) to one or more columns of a data set to generate a hidden column; store the data set partitioned according to a first partition scheme and the hidden column in memory of a computing system; store a set of queries run against the data set and the hidden column in the memory; process each query in the set of queries and the one or more UDFs with a machine learning model to select a second partition scheme for the data set; and reorganize the data set in the memory according to the second partition scheme.

Other aspects and features of the present disclosure will become apparent to those of ordinary skill in the art upon review of the following description of specific implementations of the application in conjunction with the accompanying figures.

Figure 1:
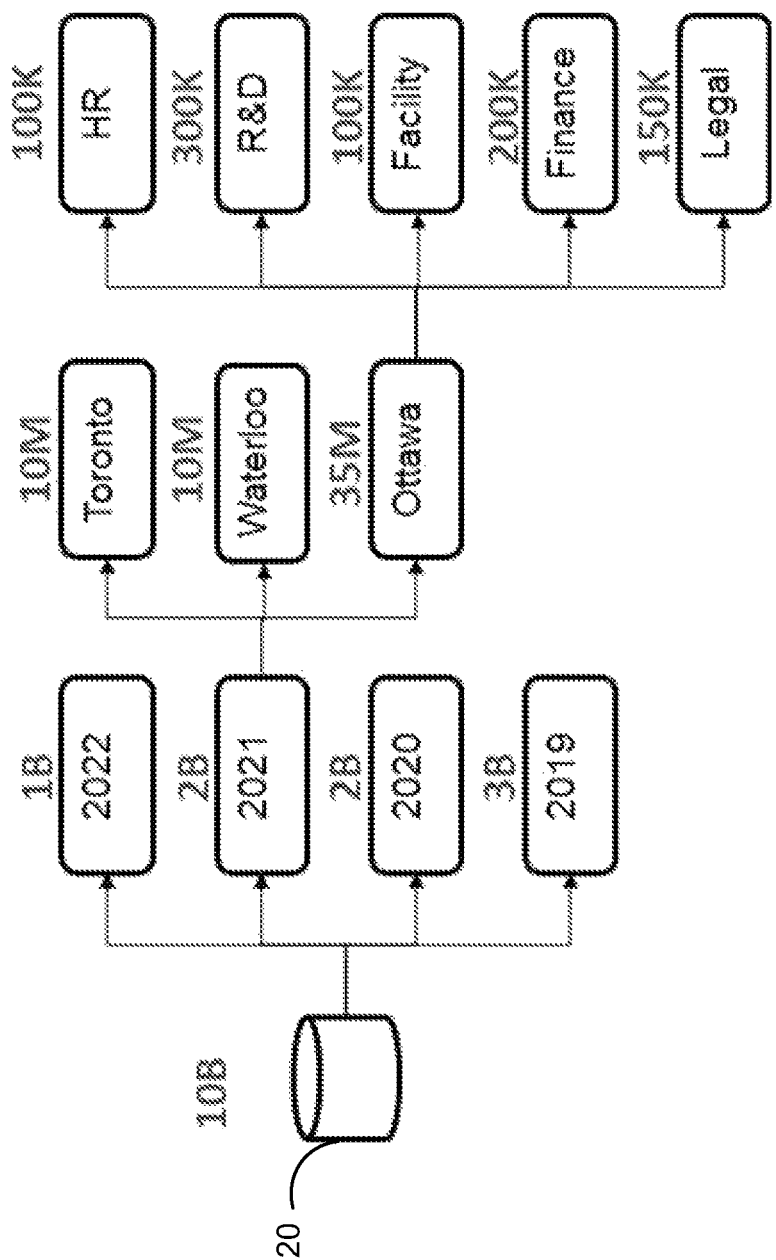
FIG. 1 is a schematic diagram of an exemplary organization schema for a dataset.

Unless otherwise specifically noted, articles depicted in the drawings are not necessarily drawn to scale.

DETAILED DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although such functions are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

FIG. 1 shows a database 20 that stores transactions. The database 20 stores ten billion individual transaction records. Each transaction record indicates a date and time of the transaction, a geographic location of the transaction, and a company department with which each transactions is associated. Of the ten billion transaction records, one billion occurred in 2022, two billion occurred in each of 2021 and 2020, and three billion occurred in 2019. Of the two billion transaction records for 2021, ten million are associated with each of Toronto and Waterloo, and 35 million are associated with Ottawa. Of the 35 million associated with Ottawa, 100,000 are associated with HR, 300,000 are associated with research and development, 100,000 are associated with facility, 200,000 are associated with finance, and 150,000 are associated with legal. By partitioning the database 20 by year, geographical region, and company department, when analysis is to be run on the data for a particular year, geographic region, and company department, the workload can be greatly reduced if only those transaction records for that year, geographic region, and company department are analyzed.

Figure 2:
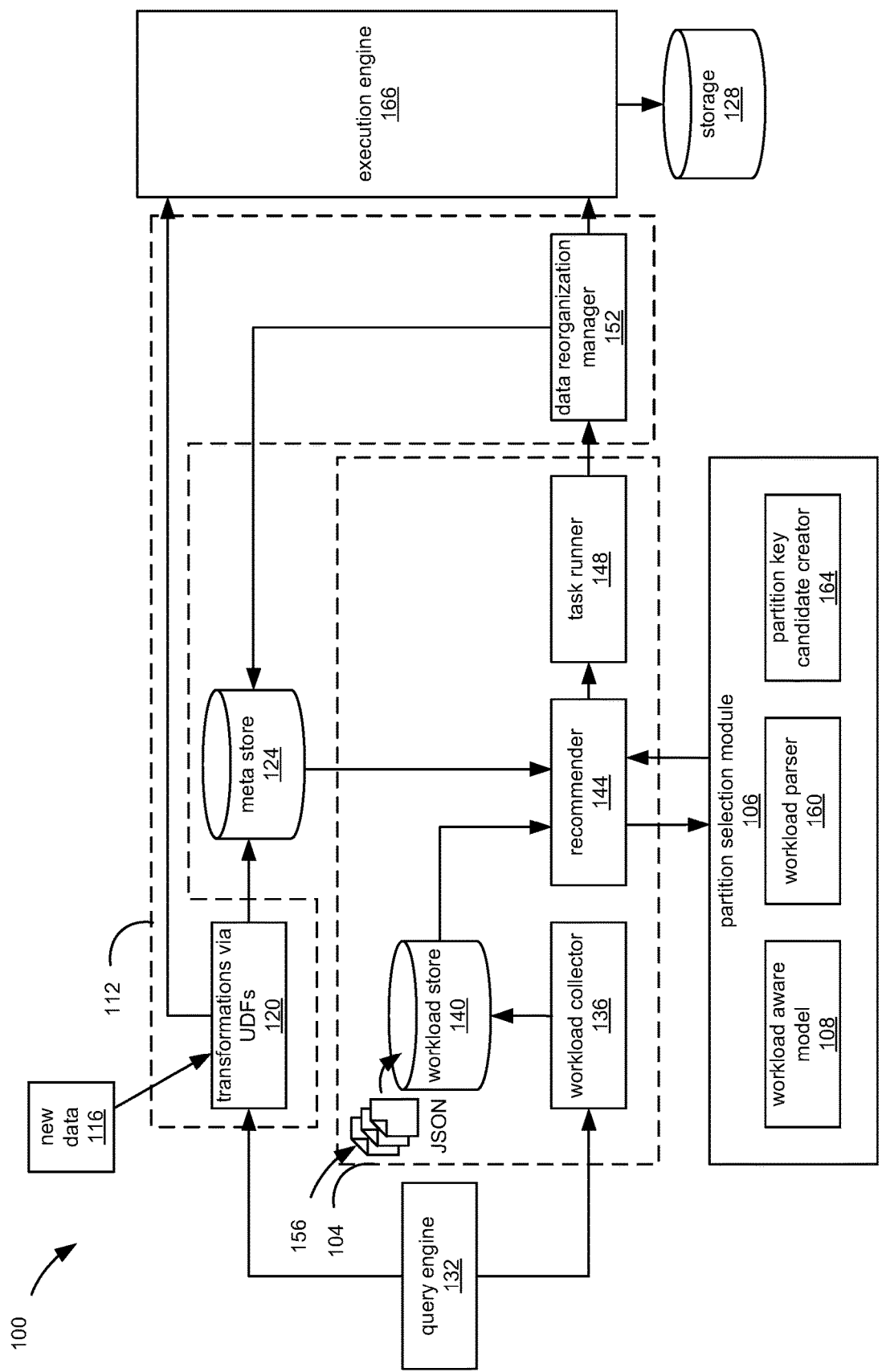
FIG. 2 shows various components of a system for reorganizing data in accordance with exemplary embodiments described herein.

FIG. 2 shows a system 100 for reorganizing data in accordance with exemplary embodiments. The system 100 utilizes a machine-learning model to predict and recommend the most optimal partitioning scheme based on the workload history and table statistics. The partitioning scheme is then automatically effected by the system 100 based on the model's recommendations. The system 100 can adapt to changing workloads by adjusting the partitioning scheme. This is done by periodically running the model to recommend a new partitioning scheme. The system 100 re-partitions the data automatically based on the new recommendations. The model also looks at the content of a column to determine if a partition can be created from part of the column value, for example, using the year portion of a timestamp column to partition by.

The system 100 has three main components: a workload aware framework 104, a partition selection module 106 that includes a workload aware model 108, and a data reorganization manager 112.

Figure 3:
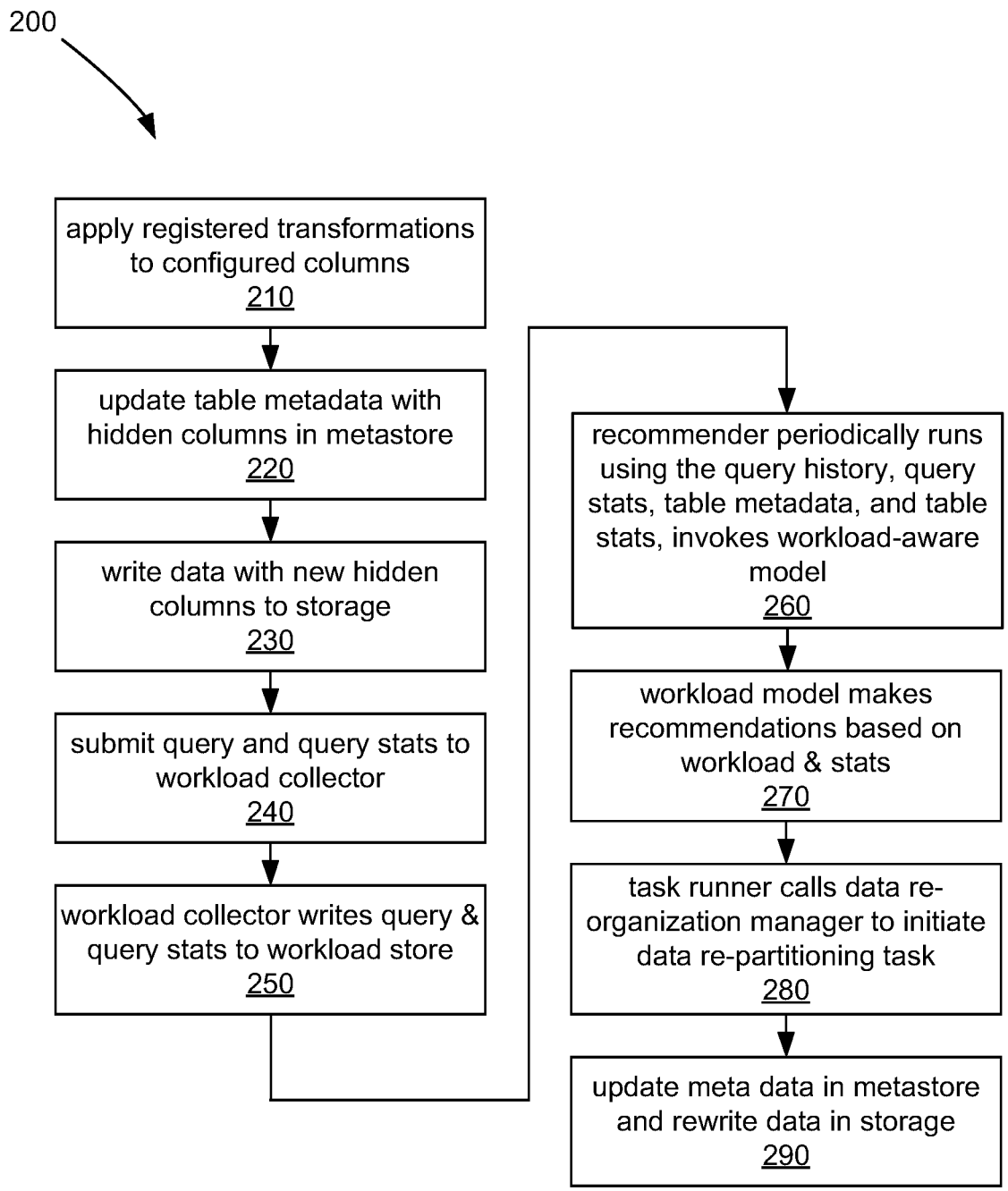
FIG. 3 is a flowchart of a general method of reorganizing data in accordance with exemplary embodiments described herein.

FIG. 3 shows a method 200 of reorganizing data in accordance with exemplary embodiments.

Referring now to FIGS. 2 and 3, as new data 116 is ingested, registered transformations 120 are applied to configured columns (210). A transformation extracts portions of a column's value and creates a "hidden" column out of it. For example, the year portion of a timestamp column that includes the full date and time is extracted via a transformation and placed in a hidden column. The table metadata is updated with the hidden columns in a metastore 124 (220). The new data is then written to storage 128 along with the new hidden columns (230).

When a query engine 132 completes a query of the data stored in the storage 128, the query engine 132 submits the query and query stats to a workload collector 136 (240). Next, the workload collector 136 writes the query and query stats to a workload store 140 (250). A recommender 144 periodically runs, taking as input the query history and query stats from the workload store 140, and table metadata and table stats from the meta store 124, and invokes the workload aware model 108 with this data (260). The workload aware model 108, in turn, makes recommendations based on the workload and stats (270). A task runner 148 takes those recommendations and calls a data reorganization manager 152 to initiate a data re-partitioning task (280). During the data re-partitioning task, the data reorganization manager 152 updates the meta data in the meta store 124, and re-writes the data in storage 128 (290).

The workload aware framework 104 automatically drives the data re-organization tasks. It invokes the recommender 144, and the task runner 148 based on the recommendations. The flow is initiated after a query completes and the query engine 112 sends the query and query stats to the workload collector 136. The workload collector 136 persists the query in the workload store 140 which can be a distributed filesystem such as HDFS. The query and query stats (alternatively referred to as the workloads 156) are persisted in the workload store 140 in JSON format. The recommender 144 periodically wakes up and processes the workloads 156 by calling the workload aware model 108. The model 108 analyzes the workloads 156 and produces a recommendation that the task runner 148 acts on. The task runner 148 triggers the data re-organization by calling the data reorganization manager 152.

The partition selection module 106 also includes a workload parser 160 and a partition key candidate creator 164.

An execution engine 166 effects changes to the partitioning of the data in the storage 128.

Figure 4:
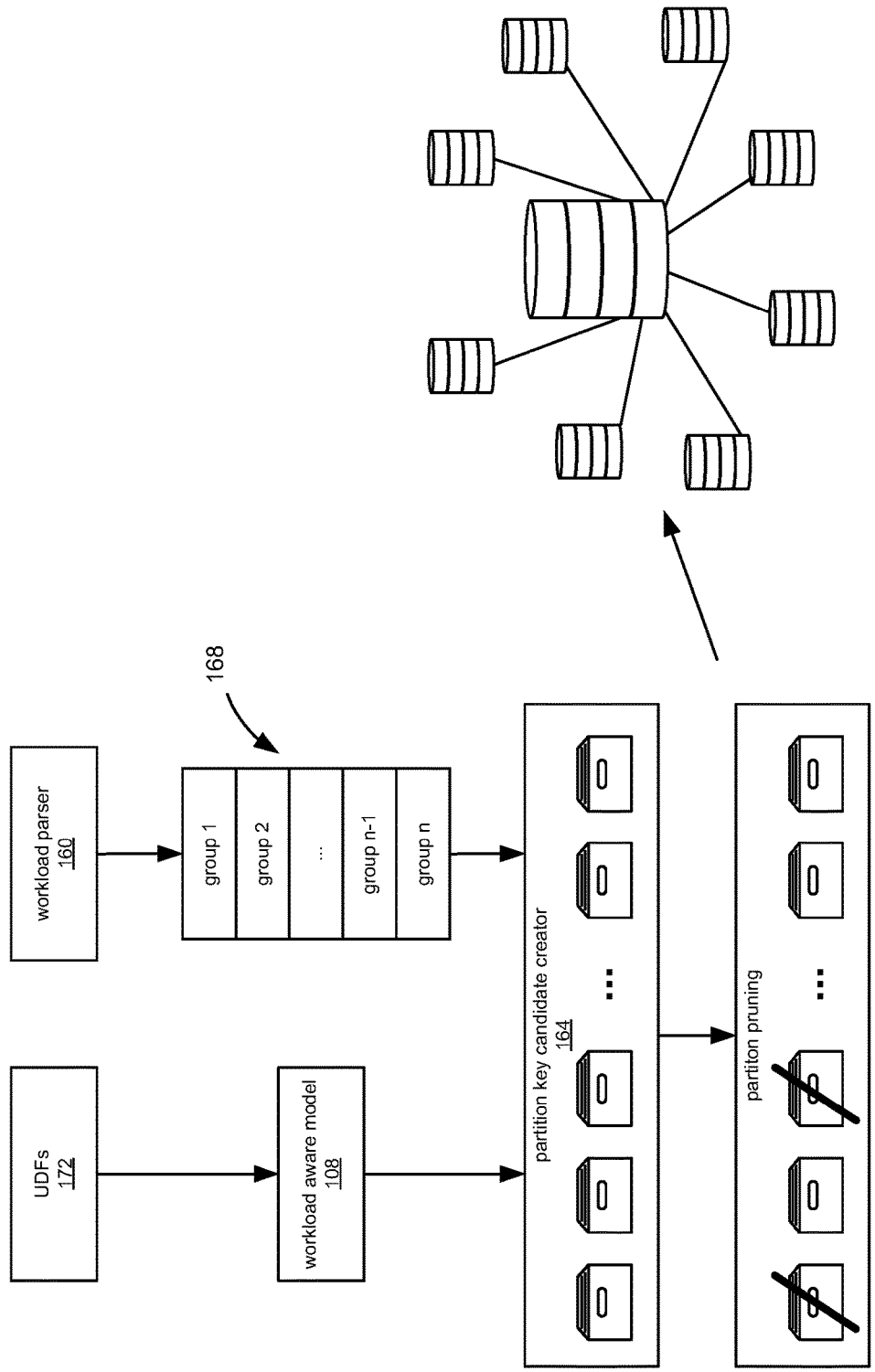
FIG. 4 illustrates a process of selecting partition key candidates and partition pruning performed by the partition selection module of FIG. 2 in accordance with some exemplary embodiments described herein.
Figure 5:
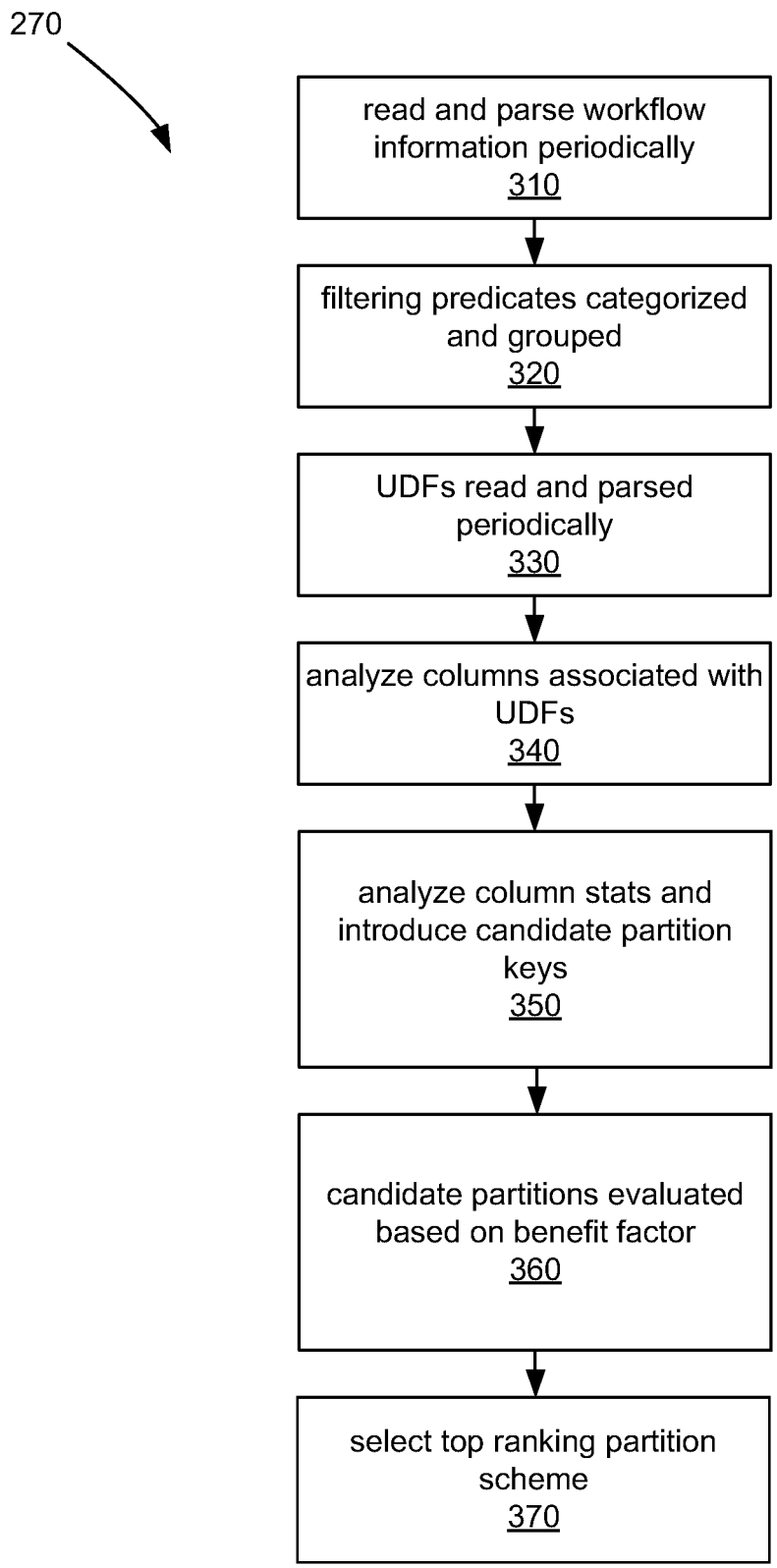
FIG. 5 is a flowchart showing a general process of selecting a new partition scheme for the data based on the workloads and UDFs in accordance with exemplary embodiments described herein.

FIG. 4 shows various components of the partition selection module 106 and their operation in greater detail. FIG. 5 shows the process 270 of selecting a partition scheme in accordance with exemplary embodiments in greater detail.

Now referring to FIGS. 4 and 5, the workload aware model 108 reads the workloads 156 periodically and parses the workload information (310). From the parsed data, filtering query predicates 168 are extracted, categorized, and grouped by the workload aware model 108 based on the columns in the filter condition (320). In the parsing process, the user defined functions (UDFs) 172 also are read periodically and parsed in parallel, as these UDFs may change when the workload changes (330). The workload aware model 108 analyzes the columns that are associated with the UDFs 172 and sends them to the partition key candidate creator 164 (340). To be considered a candidate partition, a partition should not be on a column used for indexing. Also, to reduce the cost of computing the BF and then sorting the candidates, some partitions that are known to not meet the benefit criteria are eliminated. In other words, it is known that these partition candidates will end up being poor recommendations or hindering performance.

The partition key candidate creator 164 analyzes the columns statistics and introduces the list of candidate partition keys (350). The analyses are based on statistical information such as the cardinality (distinct value of the column) and the frequency that the filter key that been used among the workloads.

The candidate partitions are evaluated based on their benefit factor and only candidate partitions that meet the benefit criteria are kept (360). The benefit factor is defined as the ratio of the cardinality of the candidate partition key column and the number of rows in the table.

$$BF = thr_p * \frac{Row\ (Table)}{cardinality\ (CPK)},$$

where BF is the partitioning benefit factor, CPK refers the candidate partition key that its cardinality is calculated, and $thr_p$ is the partition benefit factor threshold which is an adjustable parameter showing the minimum expected benefit from the workload aware model 108. The workload aware model 108 sorts the candidate partitions by their benefit factor in descending order, and returns the top ranking partition as the recommended partition (370).

On the table level, there is only one partition. However, a table can have a multi-level partition where each is defined on a column (they could same or different).

Figure 6:
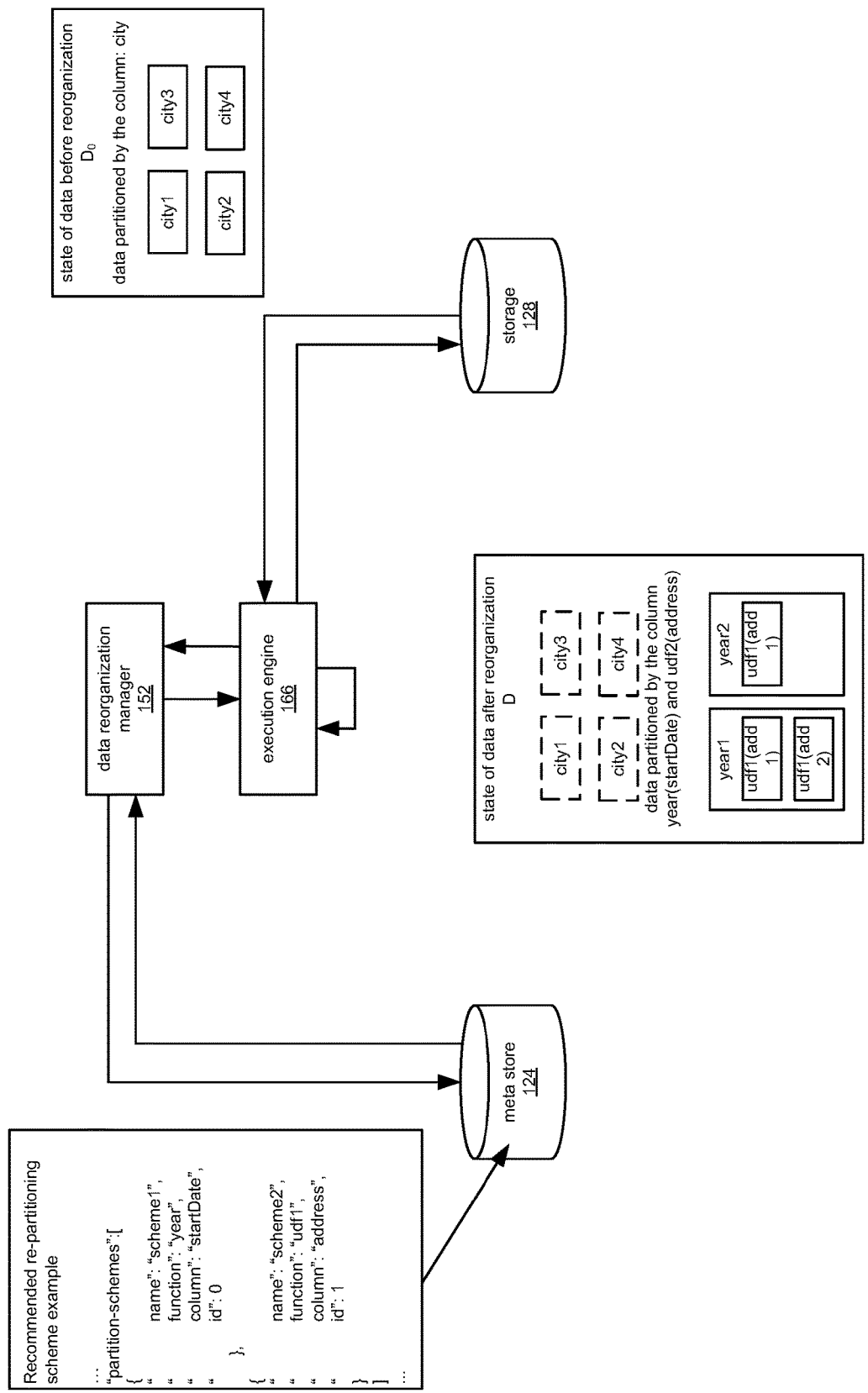
FIG. 6 illustrates the function of the data reorganization manager of the system of FIG. 2.

Now referring to FIG. 6, the data reorganization manager 152 reads the recommended repartitioning scheme, and passes the recommended repartitioning scheme to the execution engine 166. The execution engine 166 loads the data to reorganize, assuming that it was previously partitioned by the city column. The execution engine 166 reorganizes the data according to the recommended re-partitioning scheme.

The execution engine 166 persists the newly re-organized data D and deletes the old one $D_0$. Once the reorganized data D is persisted and replaced the old data $D_0$, the execution engine 166 notifies the data reorganization manager 152 by passing metadata about the reorganized data D.

The data reorganization manager 152 writes and commits the new metadata in the meta store 124.

Using the approaches described herein, the overall performance of the system in responding to queries is improved without manual intervention. The system automatically repartitions the data based on the workloads experienced, Adaptive partitioning of data files based on workload history, and statistics. The partitioning scheme adapts to changing workloads. This allows for a more optimal partitioning scheme which results in more performant queries.

Further, user-defined functions (UDFs) are used to automatically create hidden columns, for example the year portion of a timestamp column. By creating hidden columns, these columns can be used as the partitioning key. Typically, these columns are of lower cardinality; for example, year vs timestamp. By using these hidden columns as partition keys, better filtering can be achieved (i.e., filter out entire data files for the year 2012), resulting in less disk accessing.

The system can be extended to support other data organization techniques such as sorting, and bucketing. Partitioning is only one data organization technique that can be used to accelerate queries. Other techniques such as sorting, and bucketing can be performed to help improve the performance of range queries and join queries.

Figure 7:
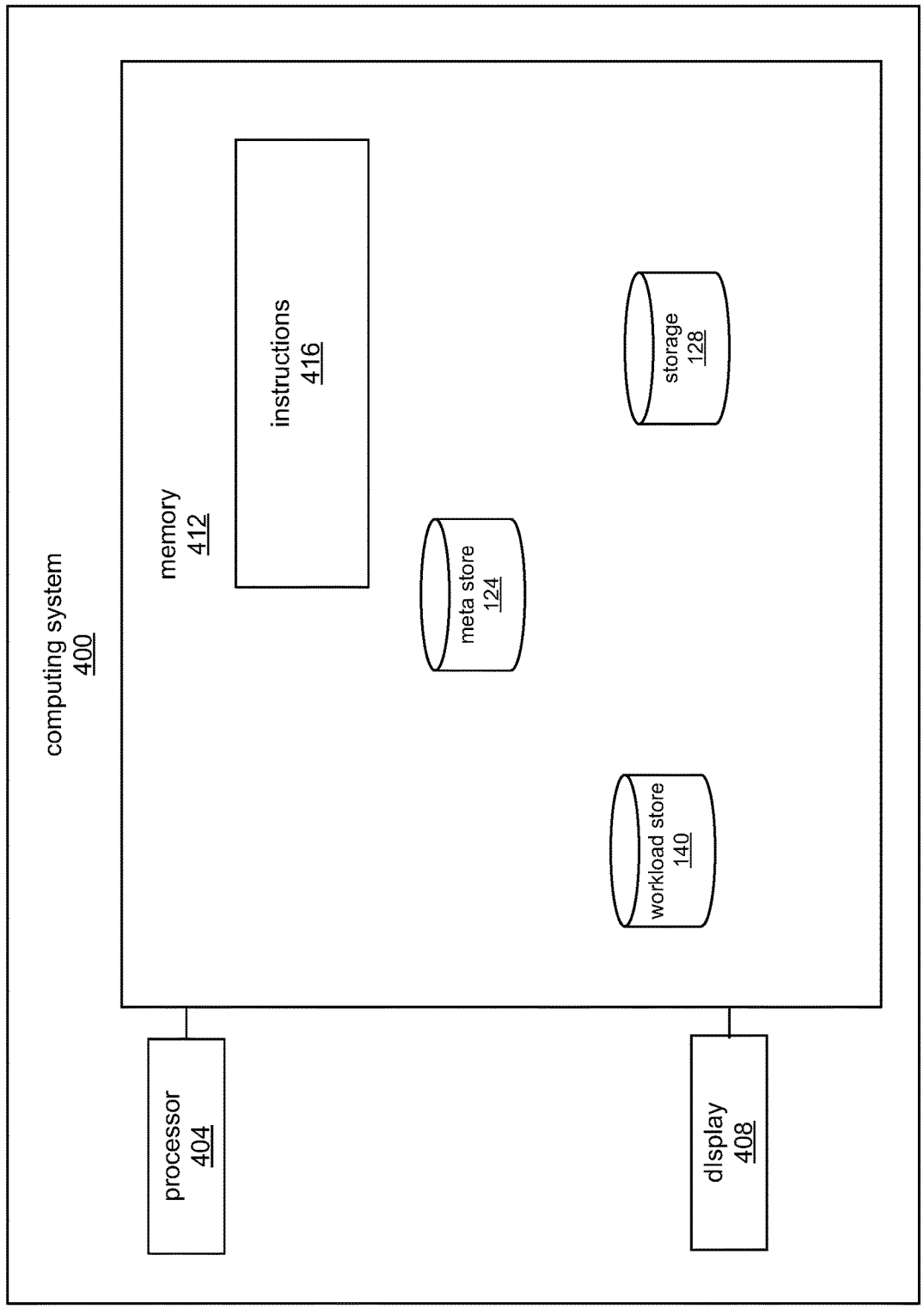
FIG. 7 is a schematic diagram illustrating various physical and logical components of a system for reorganizing data in accordance with some exemplary embodiments described herein.

FIG. 7 shows various physical and logical components of an exemplary computing system 400 for reorganizing data in accordance with exemplary embodiments of the present disclosure. Although exemplary embodiments of the computing system 400 is shown and discussed below, other embodiments may be used to implement examples disclosed herein, which may include components different from those shown. Although FIG. 7 shows a single instance of each component of the computing system 700, there may be multiple instances of each component shown.

The computing system 400 includes one or more processors 404, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 104 may collectively be referred to as a processor 404. The computing system 100 may include a display 408 for outputting data and/or information in some applications, but may not in some other applications.

The computing system 400 includes one or more memories 412 (collectively referred to as "memory 412"), which may include a volatile or non-volatile memory (e.g., a flash memory, a random access memory (RAM), and/or a read-only memory (ROM)). The non-transitory memory 412 may store machine-executable instructions for execution by the processor 404. A set of machine-executable instructions 416 defining an application process for reorganizing data (described herein) is shown stored in the memory 412, which may be executed by the processor 404 to perform the steps of the methods for reorganizing data described herein. The memory 412 may include other machine-executable instructions for execution by the processor 404, such as machine-executable instructions for implementing an operating system and other applications or functions.

The memory 412 stores the meta store 124, the workload store 140, the workload aware model 108, and the storage 128 as described herein.

In some examples, the computing system 400 may also include one or more electronic storage units (not shown), such as a solid state drive, a hard disk drive, a magnetic disk drive and/or an optical disk drive. In some examples, one or more datasets and/or modules may be provided by an external memory (e.g., an external drive in wired or wireless communication with the computing system 400) or may be provided by a transitory or non-transitory computer-executable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 412 to implement data storage, retrieval, and caching functions of the computing system 400.

The components of the computing system 400 may communicate with each other via a bus, for example. In some embodiments, the computing system 400 is a distributed computing system and may include multiple computing devices in communication with each other over a network, as well as optionally one or more additional components. The various operations described herein may be performed by different computing devices of a distributed system in some embodiments. In some embodiments, the computing system 100 is a virtual machine provided by a cloud computing platform.

Although the components for the various functions of the system 20 are shown as part of the computing system 400, it will be understood that separate computing devices can be used for training and using the audio-visual transformation network 20 for generating visual images from audio data.

The steps (also referred to as operations) in the flowcharts and drawings described herein are for purposes of example only. There may be many variations to these steps/operations without departing from the teachings of the present disclosure. For instance, the steps may be performed in a differing order, or steps may be added, deleted, or modified, as appropriate.

In other embodiments, the same approach described herein can be employed for other modalities.

General

Through the descriptions of the preceding embodiments, the present invention may be implemented by using hardware only, or by using software and a necessary universal hardware platform, or by a combination of hardware and software. The coding of software for carrying out the above-described methods described is within the scope of a person of ordinary skill in the art having regard to the present disclosure. Based on such understandings, the technical solution of the present invention may be embodied in the form of a software product. The software product may be stored in a non-volatile or non-transitory storage medium, which can be an optical storage medium, flash drive or hard disk. The software product includes a number of instructions that enable a computing device (personal computer, server, or network device) to execute the methods provided in the embodiments of the present disclosure.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present invention and its advantages have been described in detail, it should be understood that various changes, substitutions and alterations can be made herein without departing from the invention as defined by the appended claims.

The present invention may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computer-implemented method for reorganizing data, comprising:
   executing, via a computing system, one or more user defined functions (UDFs) on one or more columns of a data set in memory of the computing system to generate a hidden column;
   storing the data set partitioned according to a first partition scheme and the hidden column in the memory of;
   storing a set of queries run against the data set and the hidden column in the memory;
   processing each query in the set of queries and the hidden column generated from the one or more UDFs with a machine learning model to select a second partition scheme for the data set;
   partitioning the data set in the memory according to the second partition scheme;
   receiving a query;
   performing the query on the data set partitioned in the second partition scheme in the memory to generate results; and
   responding to the query with the results.

2. The computer-implemented method of claim 1, wherein the one or more UDFs reduce a cardinality of the one or more columns of the data set.

3. The computer-implemented method of claim 1, further comprising storing query statistics for each of the set of queries, and wherein the processing each query in the set of queries includes processing the query statistics for each of the set of queries.

4. The computer-implemented method of claim 1, wherein the processing is performed at a regular interval.

5. The computer-implemented method of claim 4, wherein the regular interval is a time interval.

6. The computer-implemented method of claim 4, wherein the regular interval is a query frequency interval.

7. The computer-implemented method of claim 1, wherein the processing comprises:
   selecting two or more candidate partition schemes;
   evaluating a benefit factor for each of the two or more candidate partition schemes; and
   selecting the second partition scheme from the two or more candidate partition schemes based on the benefit factor for each of the two or more candidate partition schemes.

8. A computing system for reorganizing data, comprising:
   one or more processors;
   memory storing a data set and computer-executable instructions that, when executed by the one or more processors, cause the computing system to:
      execute one or more user defined functions (UDFs) to one or more columns of the data set to generate a hidden column;
      store the data set partitioned according to a first partition scheme and the hidden column in the memory of the computing system;
      store a set of queries run against the data set and the hidden column in the memory;
      process each query in the set of queries and the hidden column generated from the one or more UDFs with a machine learning model to select a second partition scheme for the data set;

partition the data set in the memory according to the second partition scheme;

receive a query;

perform the query on the data set partitioned in the second partition scheme in the memory to generate results; and respond to the query with the results.

9. The computing system of claim 8, wherein the one or more UDFs reduce a cardinality of the one or more columns of the data set.

10. The computing system of claim 8, wherein the computer-executable instructions, when executed by the one or more processors, cause the computing system to store query statistics for each of the set of queries, and wherein the processing each query in the set of queries includes processing the query statistics for each of the set of queries.

11. The computing system of claim 8, wherein the computer-executable instructions, when executed by the one or more processors, cause the computing system to process the queries at a regular interval.

12. The computing system of claim 11, wherein the regular interval is a time interval.

13. The computing system of claim 11, wherein the regular interval is a query frequency interval.

14. The computing system of claim 8, wherein the computer-executable instructions, when executed by the one or more processors, cause the computing system to:

select two or more candidate partition schemes;

evaluate a benefit factor for each of the two or more candidate partition schemes; and select the second partition scheme from the two or more candidate partition schemes based on the benefit factor for each of the two or more candidate partition schemes.

15. A non-transitory machine-readable medium having tangibly stored thereon executable instructions for execution by one or more processors of a computing system, wherein the executable instructions, in response to execution by the one or more processors, cause the one or more processors to:

execute one or more user defined functions (UDFs) to one or more columns of a data set stored in memory of the computing system to generate a hidden column;

store the data set partitioned according to a first partition scheme and the hidden column in memory of a computing system;

store a set of queries run against the data set and the hidden column in the memory;

process each query in the set of queries and the hidden column generated from the one or more UDFs with a machine learning model to select a second partition scheme for the data set;

partition the data set in the memory according to the second partition scheme;

receive a query;

perform the query on the data set partitioned in the second partition scheme in the memory to generate results; and respond to the query with the results.

* * * * *